US008876126B1

(12) United States Patent  (10) Patent No.: US 8,876,126 B1
Woody  (45) Date of Patent: Nov. 4, 2014

(54) SHOPPING CART RELEASE

(71) Applicant: Phillip L. Woody, Normandy Park, WA (US)

(72) Inventor: Phillip L. Woody, Normandy Park, WA (US)

( * ) Notice: Subject to any disclaimer, the term of this patent is extended or adjusted under 35 U.S.C. 154(b) by 0 days.

(21) Appl. No.: 13/998,585

(22) Filed: Nov. 13, 2013

Related U.S. Application Data

(60) Provisional application No. 61/851,142, filed on Mar. 4, 2013.

(51) Int. Cl.
*B62B 3/14* (2006.01)
*B62B 5/00* (2006.01)

(52) U.S. Cl.
CPC .... *B62B 5/00* (2013.01); *B62B 3/14* (2013.01)
USPC ................................. 280/33.992; 280/33.991

(58) Field of Classification Search
USPC ........................................ 280/33.991, 33.992
See application file for complete search history.

(56) References Cited

U.S. PATENT DOCUMENTS

| | | | | |
|---|---|---|---|---|
| 3,015,494 A * | 1/1962 | Fosbrook, Sr. | ........... | 280/33.991 |
| 4,647,055 A * | 3/1987 | Weill | ........ | 280/33.992 |
| 4,805,935 A * | 2/1989 | Grayson | .................. | 280/33.992 |
| 5,149,114 A * | 9/1992 | Lewandowski et al. | . | 280/33.992 |
| 5,199,728 A * | 4/1993 | Hutchison | ............... | 280/33.992 |
| 6,488,292 B2 * | 12/2002 | O'Quin | ..................... | 280/33.991 |
| 6,923,456 B2 * | 8/2005 | Ryan et al. | ............... | 280/33.991 |
| 7,192,035 B1 * | 3/2007 | Lioce | ........................ | 280/33.992 |
| 7,216,875 B2 * | 5/2007 | O'Quin | ..................... | 280/33.991 |
| 7,303,198 B2 * | 12/2007 | Higgins | ..................... | 280/79.11 |
| 7,396,025 B2 * | 7/2008 | Ondrasik | ................. | 280/33.991 |
| 7,562,882 B2 * | 7/2009 | Acikgoez | ................. | 280/33.992 |
| 7,857,108 B2 * | 12/2010 | Amdahl et al. | ................. | 188/19 |
| 8,544,858 B2 * | 10/2013 | Eberlein | .................. | 280/33.991 |
| 2007/0063460 A1 * | 3/2007 | O'Quin | ..................... | 280/33.992 |
| 2007/0235961 A1 * | 10/2007 | Clair | ....................... | 280/33.994 |
| 2008/0084035 A1 * | 4/2008 | Johnson et al. | .......... | 280/33.997 |
| 2013/0026725 A1 * | 1/2013 | Eberlein | .................. | 280/33.991 |

* cited by examiner

*Primary Examiner* — J. Allen Shriver, II
*Assistant Examiner* — Travis Coolman
(74) *Attorney, Agent, or Firm* — Lowe Graham Jones PLLC

(57) ABSTRACT

A shopping cart is provided with controlled frictional release devices incorporating ramps that prevent a nestable shopping cart from becoming overly engaged with a docking cart.

6 Claims, 3 Drawing Sheets

SHOPPING CART RELEASE

CROSS-REFERENCE TO RELATED APPLICATION(S)

This utility patent application claims priority from and the benefit of the filing date of Provisional Patent Application Ser. No. 61/851,142; filed Mar. 4, 2013, titled "SHOPPING CART RELEASE" by Phillip Woody in accordance with 35 U.S.C. §§119(e) and 120.

TECHNICAL FIELD

The invention relates to shopping carts specifically. More specifically, the invention relates to methods and apparatus for nestable shopping carts.

BACKGROUND OF THE INVENTION

The prior art encompasses a wide variety of wheeled carts used by shoppers to transport goods to be purchased, and from a store to the shopper's home. Prior to the advent of the modern supermarket, shopping had to be done on a daily basis and shopping carts were relatively small. A convention prior-art shopping cart used for daily shopping purposes was known to consist of two wheels connected to a collapsible shopping basket having a handle. The shopper used the basket both when selecting items within a store, and for transporting the goods from the store to the home, frequently by way of public transportation. With the advent of the supermarket, daily shopping became a thing of the past and shopping carts became considerably larger. A typical modern shopping cart comprises a mesh (metal or plastic) main basket having two fixed rear wheels, and two front caster wheels propelled by way of a rearwardly positioned handle. In Europe, shopping tends to be more or less a daily or other-day affair, and wheeled shopping carts are still relatively small, perhaps having a volume of only four cubic feet. Carts of this type may be similar to the prior-art two-wheeled cart, or may more conventionally comprise a four-wheeled cart similar to the large, American-style cart but with a shallower basket. In the smaller European design, the basket frequently is located approximately at waist height and may be tipped up so that the shopping carts may nest with one another in a compact fashion. The American-style cart is typically much larger, having a volume of approximately ten to twelve cubic feet with a very deep, fixed basket. The American-style carts are often also nestable. However, due to the fixed basket, the rear wall of the cart is frequently pivotable about a horizontal axis located adjacent the rearwardly disposed handle to facilitate nesting. A nestable cart is advanced toward the rear end of a docking cart, such that the rear wall of the docking cart pivots upwardly when impacted and the front end of the nestable cart advances into a docked position.

At American-style supermarkets, shoppers are encouraged to nest and dock their own carts at the location of the store. Thus nested carts may be ten or fifteen carts deep at times before a customer removes a nested cart from its docked position at the end of that queue. Particularly with the American-style carts, it is known that a nested cart may become "jammed" or stuck with respect to a previously docked cart. Indeed, significant force may be required to separate the nested cart from its docked counterpart. Should the frictional engagement between the nested cart and the docked cart be significantly large, some shoppers, such as the elderly, children, and the like, may not be able to dislodge the nested cart from the docked cart and assistance may be required. This problem is exacerbated in stores and shopping areas where shopping carts are permitted into the parking lot. In these situations, customers are encouraged to dock their carts with respect to one another in a shopping cart nesting area somewhere within the parking lot. An employee of the store then ventures into the parking lot, and retrieves a long sequence or "train" of shopping carts, sometimes ten or fifteen shopping carts long, and pushes those carts back into the store for selection by a shopper. Sometimes, a store may be slightly uphill from the parking lot nesting island for the carts. In that scenario, the store employee may need to use significant force to push the train of nested carts up the hill into the store. Such a process disadvantageously applies an excessive nesting force to the train of carts, such that once the nested train is deposited adjacent the front of the store, one or more carts may become excessively retained within the train, making it nearly impossible for an average shopper to release the cart. In that event, all the carts ahead of the jammed cart become unusable and significant shopper frustration may occur. It is not unknown for certain shoppers, particularly the elderly, infirm, or small of stature, to avoid shopping at establishments where it is difficult or impossible for those shoppers to retrieve a nested shopping cart, which has become "jammed" in a train of nested, docked carts. As a result, establishments employing nesting islands in parking lots may lose valuable customers due to such frustration.

Some grocery markets in Europe now require a shopper to leave a deposit to unleash a shopping cart from a train of nested carts. Typically, two coins must be deposited to unleash a cart from an adjacent cart. When the cart is returned, nested and re-leashed, one coin is returned. The smaller European style carts tend to be more jam resistant because the baskets are folded up out of the way before nesting and only the structurally rigid tubular frames come into engagement. In the larger American style carts, it is the mesh baskets themselves, often deformed which come into engagement and are prone to jamming. Clearly, a U.S. shopper would become extremely frustrated if she paid two coins, unleashed her cart but could not separate it from the queue or train of nested carts should such a system ever come to the Americas.

A need therefore exists for an apparatus that can prevent existing nestable shopping carts from coming into excessive frictional engagement with a docking cart, such that retrieval of the nested cart from a shopping cart train is facilitated.

BRIEF SUMMARY OF THE INVENTION

It is therefore an object of the present invention to provide a controlled frictional release device for a nestable shopping cart.

It is a further object of the present invention to provide a controlled frictional release device for a nestable shopping cart that is retrofittable to existing shopping carts.

It is yet another object of the present invention to provide a controlled, frictional release device for a nestable shopping cart, which achieves the above objects and which also is inexpensive to manufacture.

The invention achieves the above objects, and other objects and advantages that will become apparent from the description that follows, by providing a controlled frictional release device for nestable shopping carts that can be laterally positioned on an existing shopping cart so as to provide positive and negative gradients in a forward and negative direction of cart travel, respectively, to prevent excessive ingress of a nestable shopping cart into a docked position with respect to a docking cart.

In a preferred embodiment of the invention, the controlled frictional release device is provided with a laterally mountable inclined first surface selectively locatable on a first side of the nestable shopping cart. The first surface preferably has a positive gradient in a forward direction of conventional cart travel to prevent excessive ingress of the nestable cart into a docked position with respect to a first docking cart. A laterally mountable declined second surface is preferably located adjacent and aligned with the first surface and has a negative gradient with respect thereto so as to provide an alternate, replaceable first surface. In this fashion, a controlled frictional release force is generally provided between the nestable cart and the first docking cart, so as to prevent the nestable cart from becoming jammed with respect to the first cart. In addition, the second surfaces can replace the first surface once the first surface becomes excessively worn.

In preferred embodiments of the invention, the surfaces have inclination and declination slopes of approximately twenty degrees and are manufactured from an elastomeric polymer. The inclination and declination surfaces may be discrete structures attached to a substrate that is removably attachable to the lateral sides of the nestable shopping cart. Alternatively, the inclination and declination surfaces can be formed integrally with the basket of the cart at the time that the cart is manufactured.

DETAILED DESCRIPTION OF THE PREFERRED EMBODIMENTS

Figure 1:
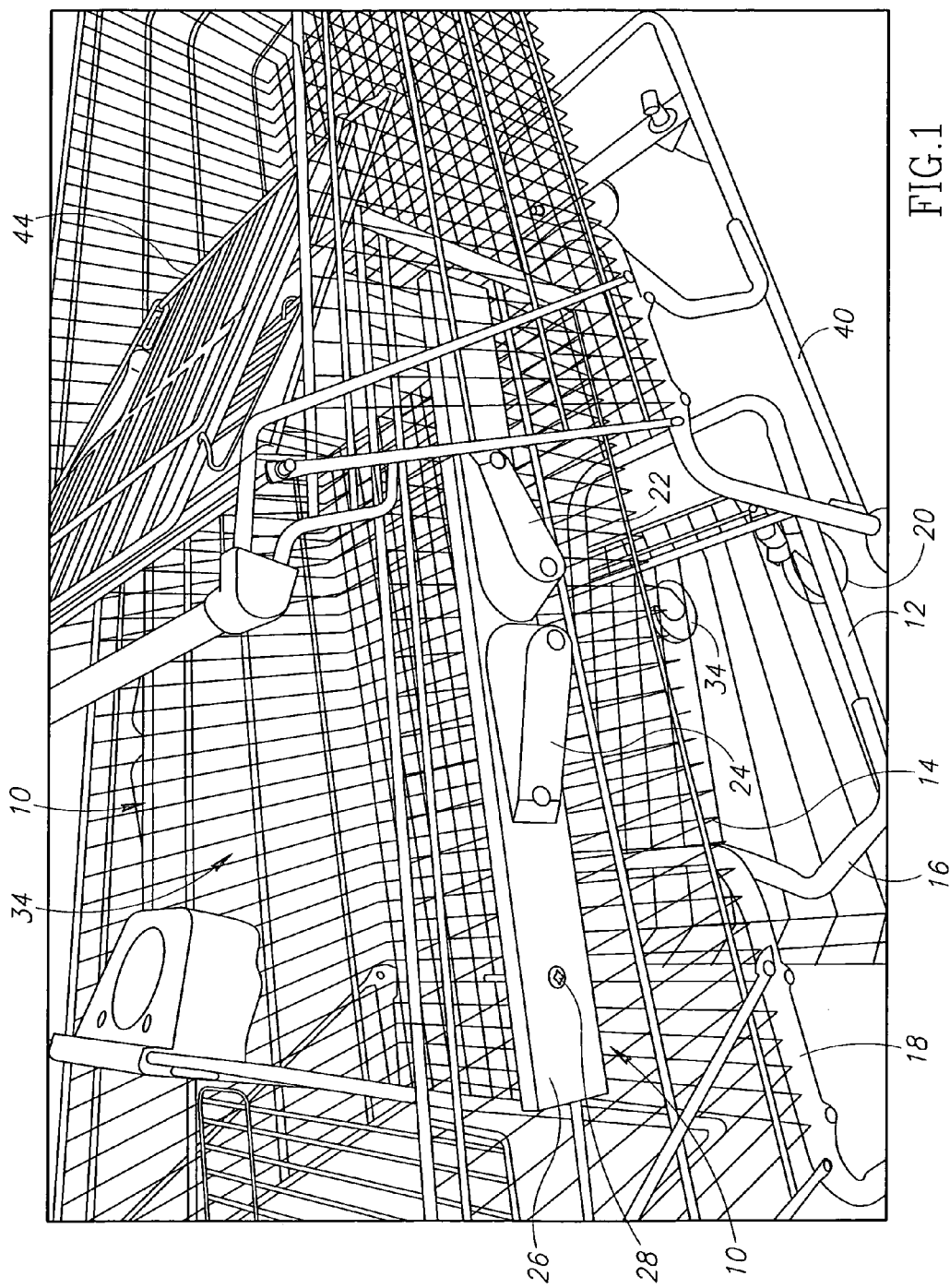
FIG. 1 is a perspective environmental view of a nestable shopping cart employing a controlled frictional release device of the present invention about to become engaged with a first docking cart.

Controlled frictional release devices in accordance with the principles of the invention are generally indicated at reference numeral 10 in the various FIGURES of the attached drawings, wherein numbered elements in the FIGURES correspond to like-numbered elements herein. The devices are removably attached in the preferred embodiment to the left and right lateral sides of a conventional nestable shopping cart 12. The illustrated shopping cart is of the "American style", having a large wire basket 14 supported on a tubular frame 16, supported by a pair of rotatable rear wheels 18, and forwardly mounted caster wheels 20.

Figure 2:
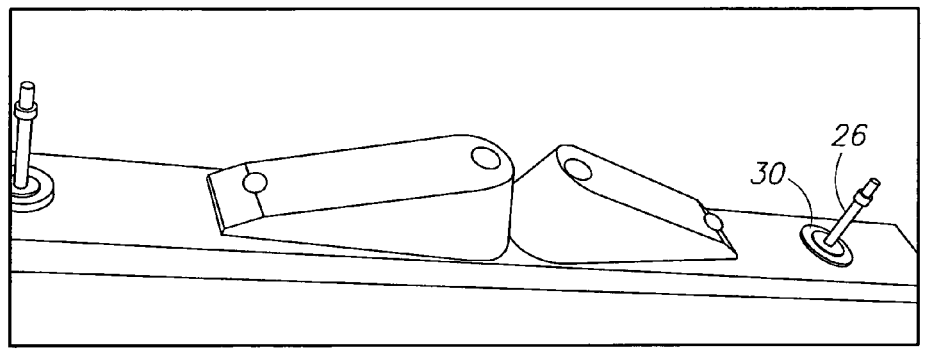
FIG. 2 is a right front perspective view of the frictional release device.
Figure 3:
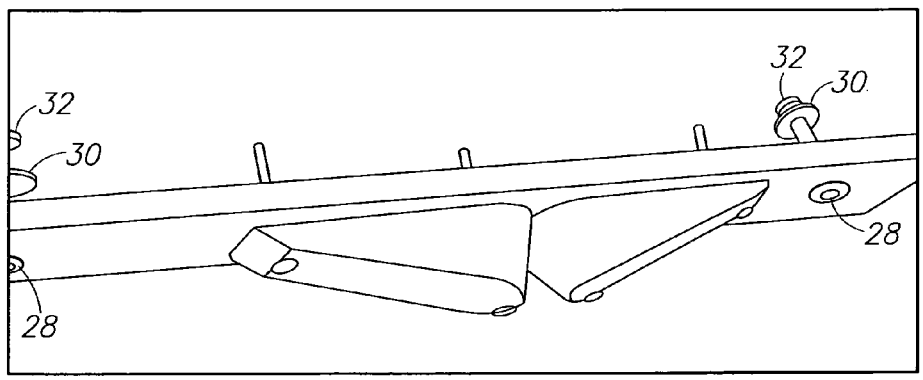
FIG. 3 is a right perspective view of the controlled frictional release device.
Figure 4:
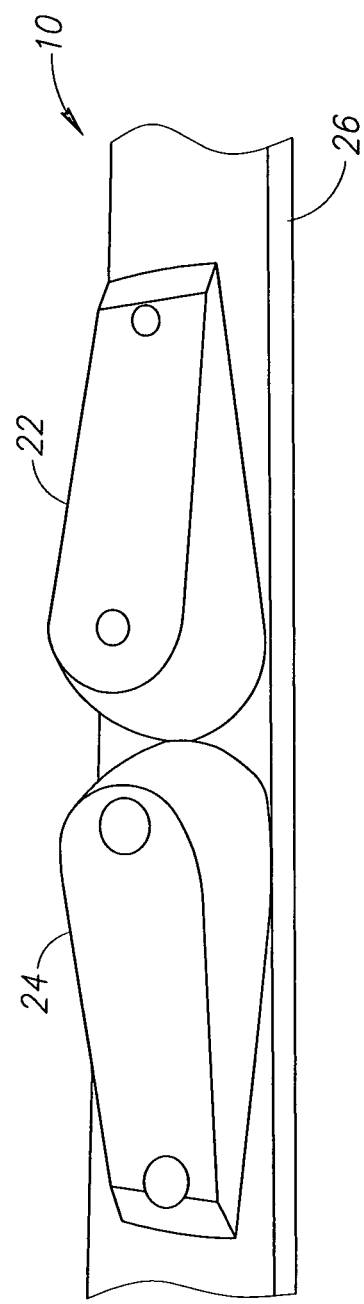
FIG. 4 is a perspective view of the release surfaces.

The devices 10 are preferably removably connected to left and right sides of the shopping cart 12. Each device has longitudinally aligned first and second inclined and declined surfaces 22, 24 mounted on an elongated substrate 26. The substrate has means, such as bolts 28, and cooperative wingnuts 30 and washers 32 (see FIG. 2), for mounting the substrate to apertures in the gridwork 34 of the wire basket 14. The first and second surfaces 22, 24 preferably have positive and negative gradients of approximately twenty degrees, such that, when the nestable shopping cart 12 is advanced into nestable engagement with a first docking cart 40, a rear wall of the first docking cart pivots open, as shown in FIG. 1, while the positive gradient of the first inclined surface 22 prevents the nestable cart 12 from becoming excessively frictionally engaged with the first docking cart 40. The resilient nature of the surface 22 combined with the positive gradient provides a controlled release force for the cart 12. An appropriate polymer material for manufacture of the first and second inclined surfaces 22, 24 has been found to be a conventional rubber doorstop. Alternatively, the entire release device 10 may be manufactured from an appropriate polymer, such as acrylonitrile butadiene styrene (ABS).

The second decline surface 24 serves a replacement function with respect to the first surface. Thus, the device 10 is ambidextrous in that it may be placed on either the left or right side of the cart with the forward and trailing ends of the device rotated 180 degrees when the original first surfaces become excessively worn.

The devices 10 may be constructed as retrofit devices, as shown in the FIGURES, or alternately manufactured in place with the shopping carts themselves. Such an integrated structure is contemplated where the shopping baskets are manufactured from a molded polymer product and the first inclined surface is included at the time of manufacture.

Those of ordinary skill in the art will conceive of other alternate embodiments of the invention upon reviewing this disclosure. Thus, the invention is not to be limited to the above description, but is to be determined in scope by the claims, which follow.

I claim:

1. A controlled frictional release device for a nestable shopping cart, comprising:
   an elongated substrate adapted for mounting the device to a lateral side of the nestable shopping cart;
   an inclined first surface on a first side of the substrate, the first surface having a positive gradient in a forward direction of cart travel to prevent excessive ingress of the nestable cart into a docked position with respect to a first docking cart; and
   a declined second surface located adjacent and aligned with the first surface on the substrate having a negative gradient with respect thereto, so as to provide a substitutable inclined surface for the first surface in the event the first surface receives excessive wear and becomes a worn surface, such that the substrate can be demounted, rotated through 180 degrees and remounted on the nestable cart to effectively replace the worn surface, whereby a controlled frictional release force is generally provided between the nestable cart and the first docking cart, wherein the first and second surfaces are discrete structures attached to the substrate.

2. The device of claim 1, wherein the substrate has means for removably attaching the device to the lateral side of the nestable shopping cart.

3. The device of claim 1, wherein the discrete structures are conventional elastomeric inclined-plane doorstops.

4. A pair of laterally removably mounted controlled release devices, each device having first and second respective inclined and declined surfaces on a substrate, the first and second surfaces each having respective positive and negative gradients located with resect to a forward direction of travel of a nestable cart, such that when the pair of devices are mounted to the nestable cart, the first surface prevents the nestable cart from excessive ingress into receipt with a first docking cart and the second surface provides a replacement surface in the event that the first surface receives excessive wear, whereby a controlled frictional release force is generally provided between the nestable cart and the first docking cart wherein the first and second surfaces are discrete structures attached to a substrate.

5. The device of claim 4, wherein the substrate has means for removably attaching the device to the lateral side of the nestable shopping cart.

6. The device of claim 4, wherein the discrete structures are conventional elastomeric inclined-plane doorstops.

\* \* \* \* \*